United States Patent [19]

Raible et al.

[11] 3,723,996
[45] Apr. 3, 1973

[54] CLOTH COVERED HEART VALVE WITH PROTECTED CAGE LEGS

[75] Inventors: Donald A. Raible, Orange; Will R. Pierie, Newport Beach, both of Calif.

[73] Assignee: American Hospital Supply Corporation, Evanston, Ill.

[22] Filed: Dec. 7, 1971

[21] Appl. No.: 205,506

[52] U.S. Cl....................3/1, 3/DIG. 3, 137/533.11, 137/533.19
[51] Int. Cl................................................A61f 1/22
[58] Field of Search.....3/1, DIG. 3; 137/533, 533.11, 137/533.13, 533.15, 533.19

[56] References Cited

UNITED STATES PATENTS 3,466,671  9/1969  Siposs.............................................3/1
3,534,410  10/1970  Raible..........................................3/1

Primary Examiner—Richard A. Gaudet
Assistant Examiner—Ronald L. Frinks
Attorney—Lee R. Schermerhorn

[57] ABSTRACT

A cloth covering on the cage is protected on the inside surfaces of the cage legs by continuous metal track bars extending from the orifice ring to the apex of the cage. The track bars hold the movable valve member out of contact with the cloth to prevent wear on the cloth. In two embodiments the track bars form an inner metal cage nested in grooves in the legs of the main structural cage with the cloth coverings on the latter lining the grooves between the inner and outer cages. In another embodiment the track bars are of plastic material molded into the cloth coverings on the cage legs. In this embodiment the track bars project on both the inside and the outside of the cloth coverings and are held seated in grooves in the cage legs by the cloth coverings.

18 Claims, 11 Drawing Figures

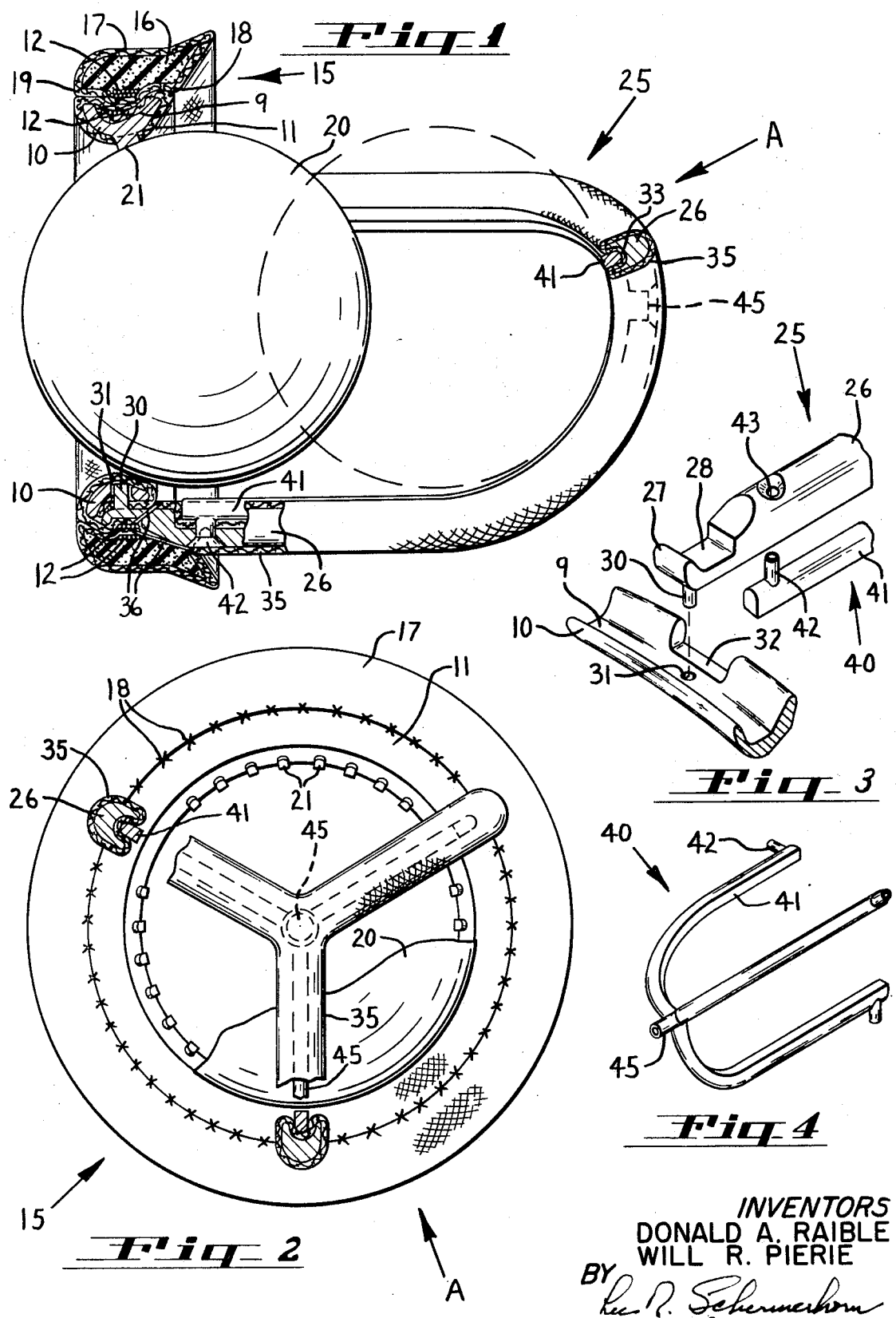

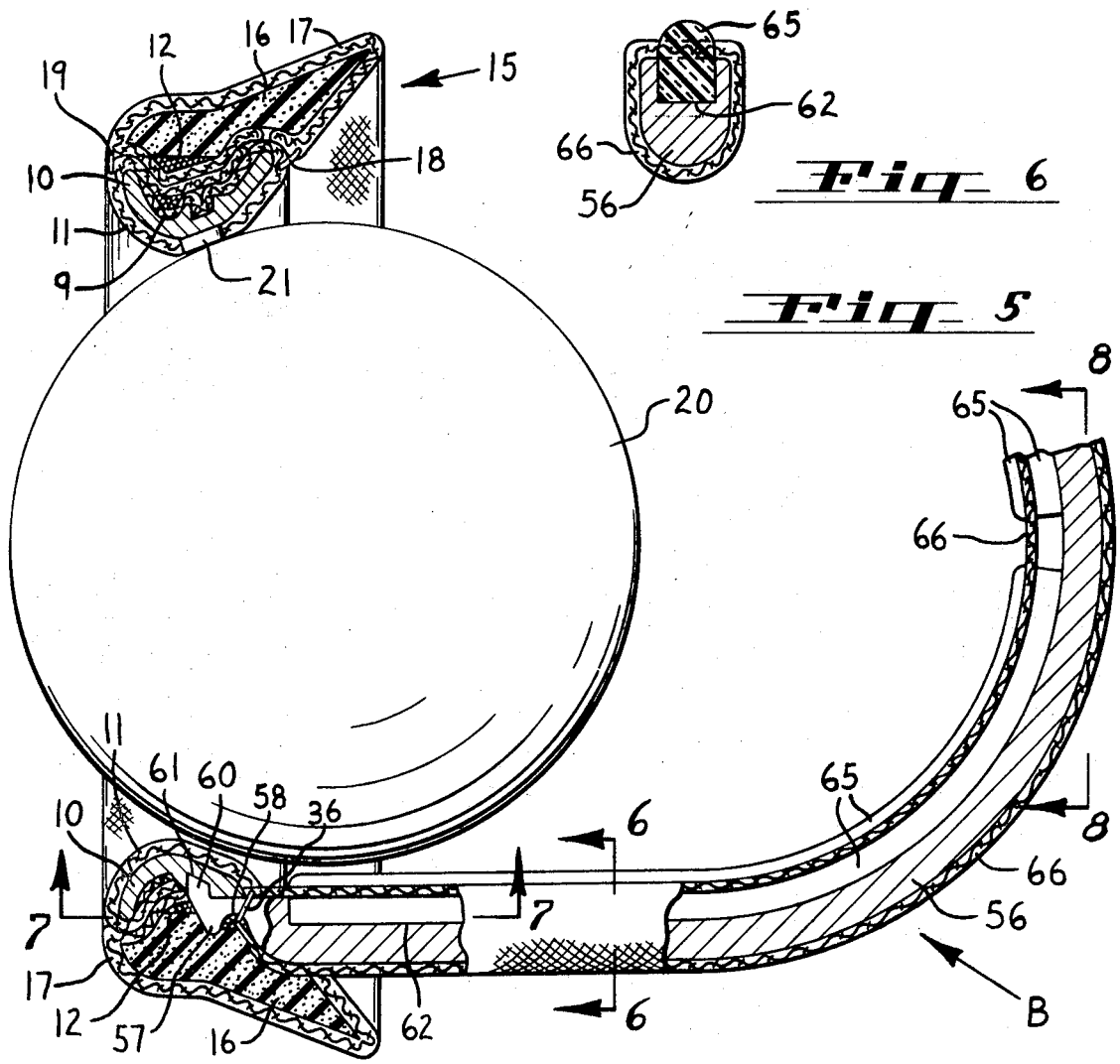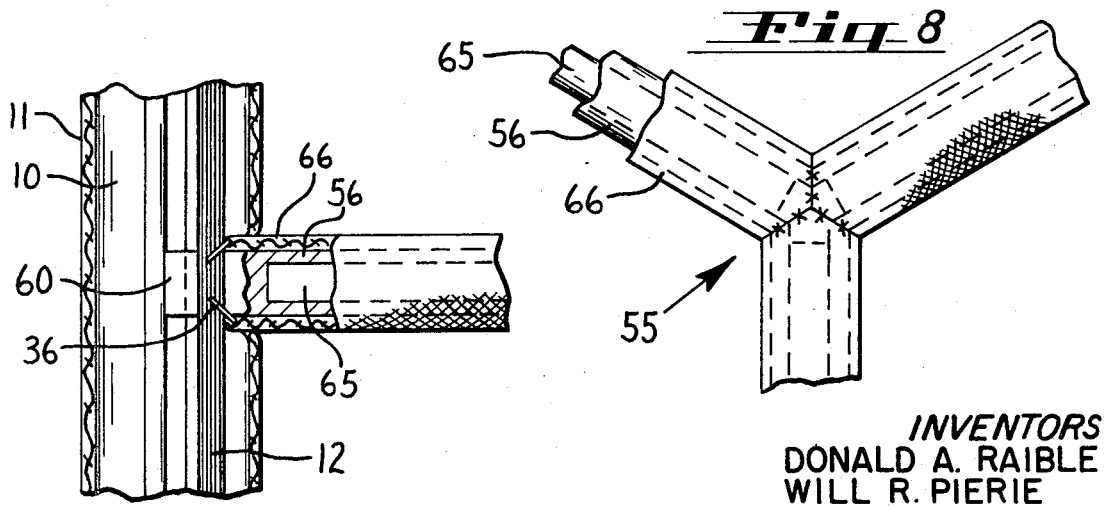

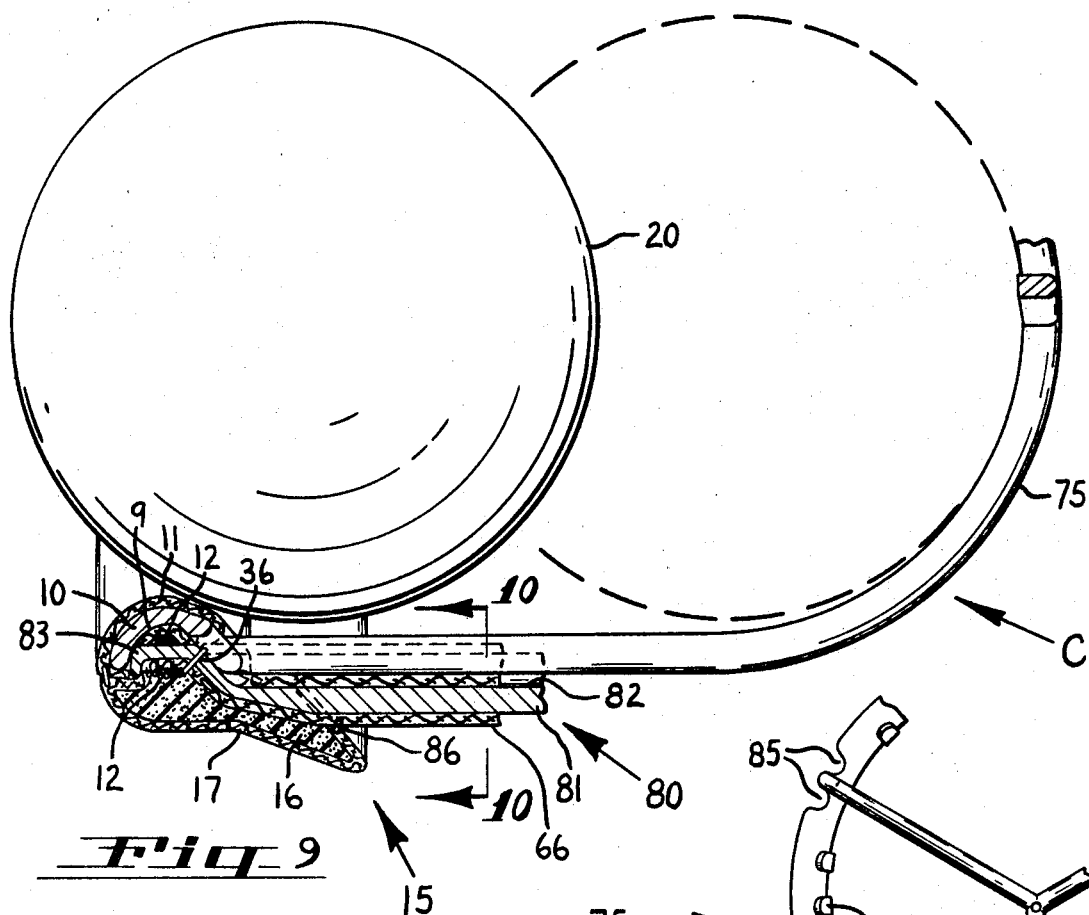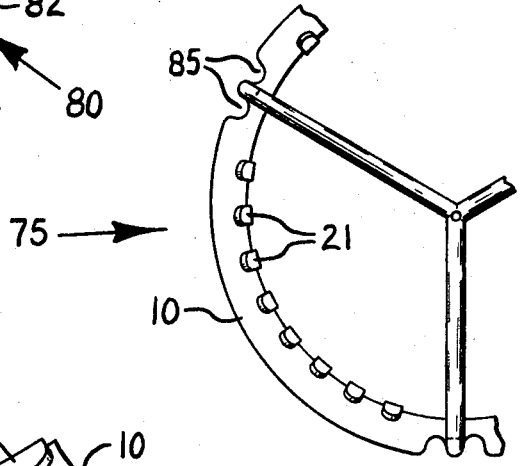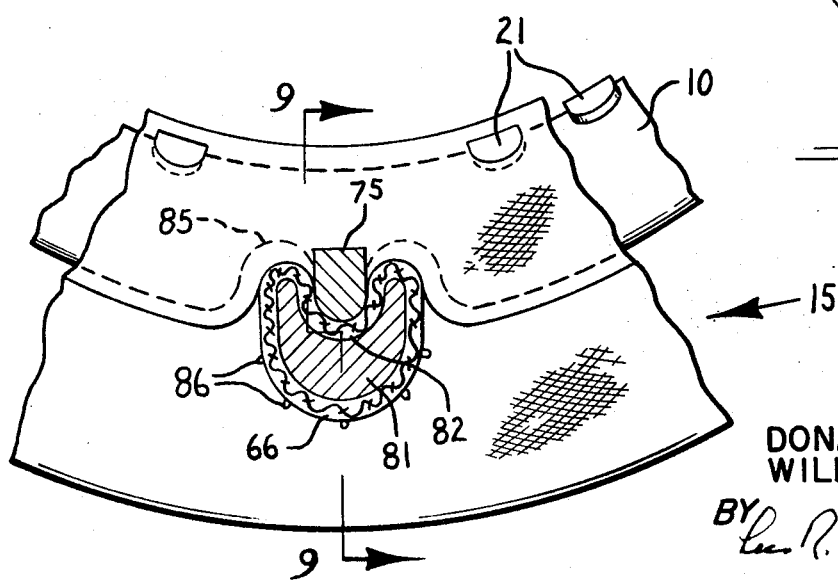

CLOTH COVERED HEART VALVE WITH PROTECTED CAGE LEGS

BACKGROUND OF THE INVENTION

This invention relates to a heart valve in which cloth coverings on the cage legs are protected against wear from the movable valve member by track bars extending along the inside edges of the cage legs to hold the valve member away from the cloth.

The desirability of covering the metal orifice ring and metal cage legs, or struts, with a porous cloth to enable tissue to completely invade and encapsulate the metal surfaces was recognized in the Siposs U.S. Pat. No. 3,466,671. See FIG. 8. This arrangement has the advantage of exposing the blood circulation to neointima instead of metal, thus reducing the instance of thrombo embolic complications and eliminating the need for long term anti-coagulants.

The desirability of protecting such cloth coverings from wear by the movable valve member was recognized in the Raible U.S. Pat. No. 3,534,410. In this disclosure spaced apart metal studs project through the cloth in areas of ball contact with the orifice ring and cage legs. Because the ball closes on a composite seat rather than the cloth alone, the orifice can be made larger with less concern for orifice cloth durability. This valve has a substantially larger orifice, relative to the size of the ball, than the valve in the Siposs U.S. Pat. No. 3,466,671.

However, in accomplishing the above noted advantages in the Raible U.S. Pat. No. 3,534,410, certain advantageous features of the Siposs U.S. Pat. No. 3,446,671 had to be compromised. The valve in Siposs U.S. Pat. No. 3,466,671 was relatively simple to manufacture and substantially eliminated all noise in the operation of the valve. The valve in Raible U.S. Pat. No. 3,534,410 is considerably more complicated and expensive to manufacture and is not as quiet in operation.

Objects of the present invention are, therefore, to provide an improved cloth covered heart valve with protected cage legs, to provide a valve which is not objectionably noisy in operation, to provide a valve which is not excessively complicated and expensive to manufacture, to provide a valve which combines the best features and advantages of the valves shown in Siposs U.S. Pat. No. 3,466,671 and Raible U.S. Pat. No. 3,534,410, and to provide a cloth covered valve having track bars on the cage legs to protect the cloth from wear by movements of the valve member.

SUMMARY OF THE INVENTION

In two embodiments, an inner metal cage provides track bars from the orifice ring to the apex of the main structural cage, holding the valve member out of contact with the cloth coverings on the legs of the main cage. The main cage legs are grooved on their inner sides to receive the legs of the inner cage, the latter depressing the cloth coverings into the grooves.

In another embodiment, plastic track bars are molded into the cloth coverings on the cage legs. The track bars have outer surfaces engaging the valve member and inner portions projecting into longitudinal grooves in the cage legs.

In all three embodiments the valve member has continuous sliding and rolling contact with the track bars and there are no isolated studs on the cage legs receiving the impact of the valve member and creating noise in the opening and closing movements of the valve member. The continuous track bars and grooved cage legs are less complicated and expensive to manufacture than separate studs spaced at intervals along the cage legs.

The track bars being substantially enclosed on three sides by the walls of the grooves in the cage legs, substantially the only surfaces of the track bars exposed to the blood stream are the track surfaces which are engaged by the movements of the valve member. The constant rubbing of the valve member against the track bars allows no opportunity for the neointima to bridge across the exposed surfaces of the track bars while at the same time the cloth coverings provide secure anchorage of the neointima on all inactive surfaces of the cage legs.

The invention will be better understood and additional objects and advantages will become apparent from the following description of the preferred embodiments illustrated in the accompanying drawings. Various changes may be made in the details of construction and arrangement of parts and certain features may be used without others. All such modifications within the scope of the appended claims are included in the invention.

BRIEF DESCRIPTION OF THE DRAWINGS

FIG. 1 is a sectional view, with parts broken away, showing a first form of valve embodying the invention;

FIG. 2 is an end view of the valve in FIG. 1, with parts broken away;

FIG. 3 is a fragmentary exploded view showing the manner of attaching the main cage to the orifice ring and the manner of attaching the inner cage to the main cage;

FIG. 4 is a perspective view of the inner cage in FIGS. 1 to 3;

FIG. 5 is a fragmentary sectional view showing a second form of valve embodying the invention;

FIG. 6 is a view on the line 6—6 in FIG. 5;

FIG. 7 is a view on the line 7—7 in FIG. 5;

FIG. 8 is a fragmentary end view showing the apex of the cage;

FIG. 9 is a fragmentary sectional view on the line 9—9 in FIG. 10, showing a third form of valve embodying the invention;

FIG. 10 is a view on the line 10—10 in FIG. 9; and

FIG. 11 is a fragmentary end view of the inner cage and orifice ring in FIG. 9.

DESCRIPTION OF THE PREFERRED EMBODIMENTS

In the valve A in the first embodiment in FIGS. 1 to 4, a metal orifice ring 10 has an outwardly facing channel 9 receiving end portions of a cloth covering 11. These end portions of the cloth are secured in the channel 9 by thread windings 12. The orifice ring is equipped with a cuff or sewing ring 15, the shape of which is determined by the particular valve in the heart which is to be replaced by the present prosthesis. An aorta valve is illustrated by way of example, the mitral valve being similar but with a different shape of cuff.

The cuff 15 comprises a flexible cushion or filler ring 16 preferably made of silicone foam rubber or Dacron felt enclosed in a cloth covering 17. The material 16 is suturable for securement to the living tissue of the heart. One end of cloth covering 17 is secured in the channel of orifice ring 10 by additional windings of thread 12 and the other end of covering 17 is secured to cloth covering 11 by stitchings 18 on the downstream face of the cuff. On the upstream face of the cuff the two coverings 11 and 17 are connected together by stitchings 19. Other forms of cuff may be employed for implantation of the prosthesis if desired.

The movable valve member is preferably a hollow metal ball 20 which seats on a ring of spaced studs 21 projecting inward from the orifice ring 10. In applying the cloth 11 to the ring 10, the mesh openings in the cloth are spread apart at each stud 21 so that the threads will pass around the studs and allow the studs to project through the cloth without impairing the integrity of the cloth, the length of the studs being approximately equal to the thickness of the cloth.

Thus, as the ball 20 seats on the studs 21, the cloth 11 makes light contact with the ball on the spaces between the studs, sealing these spaces and reducing the noise of the metal-to-metal contact. By providing rigid seating abutments for the ball, the studs 21 permit a larger orifice opening for the flow of blood when the valve is open than would be the case if the ball seated solely on the yieldable cloth 11. The larger orifice opening is accomplished without orifice cloth damage or excessive stress on the yieldable cloth.

A main structural cage 25 has a plurality of legs or struts 26 with hooked ends 27 received in the channel 9 of orifice ring 10. Each hooked end 27 provides a groove 28 to receive portions of the windings 12 whereby the cage is secured to the orifice ring. Also, the end of each leg 26 is formed with an inwardly projecting pin 30 which is received in a socket opening 31 in the bottom of the channel of the orifice ring. The downstream edge of the orifice ring is notched at 32 around each cage leg 26. Studs 21 are preferably omitted in the region of the cage legs as shown in FIG. 2. Each leg 26 contains a longitudinal groove 33 on its inner side.

Cage legs 26 are enclosed in cloth coverings 35, preferably made in the form of tubes or sleeves, the ends of which are secured to the cloth coverings 11 and 17 by stitches 36. The cloth coverings 35 are protected on the inner sides of legs 26 by an inner metal cage 40 having legs 41 which nest in grooves 33 on top of the cloth 35. The extremity of each leg 41 is equipped with an outwardly projecting pin 42 which is staked in a hole 43 in main cage leg 26. The apex of inner cage 40 is provided with a pin 45 which is staked in a hole 46 in the apex of main cage 25.

Legs 41 form track bars projecting from grooves 33 just far enough to engage the ball 20 and hold the ball out of contact with the cloth 35. Thus, in its opening and closing movements, the ball 20 rolls and slides on the track bars 41 without wearing the cloth 35 and without impact which would produce objectionable noise.

Alternatively, the main cage legs 26 may be welded to orifice ring 10 and the apex of inner cage 40 may be welded to the apex of outer cage 25. There is preferably a separate cloth tube 35 for each cage leg 26, whereby the ends of the cloth tubes may be pushed back away from the apex sufficiently to permit such welding. Regardless of the means employed for securing the apex of cage 40 to the apex of cage 25, the cloth tubes 35 are finally stitched together at the apex so as to cover the entire cage 25.

In the second embodiment shown in FIGS. 5 to 8 the metal orifice ring 50 of valve B is quite similar to the orifice ring 10 in FIG. 1, having a cloth covering 11, a suturing ring or cuff 15 and studs 21, all as described in connection with FIG. 1. A metal cage 55 has legs or struts 56 with hooked ends 57 containing grooves 58 to receive a portion of the windings 12 which secure the cage of the orifice ring. The ends of the legs are equipped with inwardly projecting pins 60 which are received in sockets 61 in the orifice ring 50. The inner side of each leg 56 contains a longitudinal groove 62.

On each leg 56 a plastic track bar 65 is embedded in a tubular cloth covering 66. A portion of track bar 65 projects outwardly from the cloth covering 66 just far enough to engage the ball 20 and hold the ball out of contact with the cloth, and another portion of the track bar projects inwardly from the cloth and fits in the groove 62. Stitches 36 secure the ends of cloth coverings 66 to the cloth coverings 11 and 17 as in FIG. 1.

Cage 55 is preferably cast in one piece and the cloth cover 66 and track bar 65 are made separately for each leg 56. Cloth cover 66 containing track bar 65 is slipped onto each cage leg 56 from the base end of the cage and the cloths are sewn together as a trifurcation at the apex. The cloth itself secures each track bar 65 to the cage 55. This cloth covered cage is then assembled to the orifice ring.

In the valve C of the third embodiment shown in FIGS. 9 to 11, an inner cage 75 is cast integrally with orifice ring 10. In an aorta valve having three cage legs the cage legs may in some instances be sprung apart sufficiently to admit the ball 20, otherwise, as in the case of a mitral valve having four cage legs, the cage may be cut apart at the apex to allow for insertion of the ball and subsequently welded together.

An integral, one piece outer structural cage 80 is then assembled on the inner cage 75. Cage 80 has legs 81 with grooves 82 to receive and nest the inner cage 75. Cloth sleeves 66 are drawn on the cage legs 81 prior to assembly of the two cages so that the cloth material will line the grooves 82 as shown in FIG. 10. Legs 81 have hooked ends 83 which are secured in the channel of orifice ring 10 by the thread winding 12. The inner and outer cages need not be connected together at the apex of the cage structure.

The legs 81 being generally U or channel shaped in cross section, the outer edge of the downstream side of orifice ring 10 is notched at 85 on opposite sides of the legs of cage 75 to receive the side flange portions of legs 81 including their cloth coverings 66. Threads or stitchings 36 secure the extremities of sleeves 66 in the channel of the orifice ring and additional stitches at 86 secure the sleeves 66 to the outer cloth covering 17 of the cuff 15.

Thus, the legs of inner cage 75 form track bars which hold the ball 20 out of contact with the cloth covering 66 on the structural cage 81. Structural cage 81 is completely enveloped by the cloth covering 66 and this covering also substantially envelops three sides of each leg of inner cage 75, leaving essentially only the ball contacting surfaces of cage 75 exposed to the blood stream.

Having now described our invention and in what manner the same may be used, what we claim as new and desire to protect by Letters Patent is:

1. A heart valve comprising an orifice ring, a valve member movable to open and closed positions relative to said orifice ring, a cage having legs connected with said ring retaining said valve member, cloth coverings on said cage legs, continuous track bars extending along and substantially coextensive with the length of the inside edges of said cage legs holding said valve member away from contact with said cloth coverings, and means holding said track bars and said cage legs in assembled relationship.

2. A heart valve as defined in claim 1, said cloth coverings comprising cloth tubes.

3. A heart valve as defined in claim 1, said cage legs having longitudinal grooves receiving said track bars.

4. A heart valve as defined in claim 3, said cloth coverings lining said grooves between said track bars and said cage legs.

5. A heart valve as defined in claim 1, said track bars being connected together at the apex of the cage forming an inner cage within said first cage.

6. A heart valve as defined in claim 5, said inner cage being connected to and supported by said first cage.

7. A heart valve as defined in claim 5, said orifice ring having an outwardly facing channel therearound and the legs of said first cage having hooked ends secured in said channel.

8. A heart valve as defined in claim 7 including pins on the ends of the legs of said first cage and sockets in said orifice ring receiving said pins.

9. A heart valve as defined in claim 7, said inner cage being integral with said orifice ring.

10. A heart valve as defined in claim 1, said cage legs having longitudinal grooves receiving said track bars, said cloth coverings lining said grooves between said track bars and said cage legs, and said track bars being connected together at the apex of said cage forming an inner cage nested in said first cage.

11. A heart valve as defined in claim 10, said first cage being a separate member mounted on said orifice ring and said inner cage being a separate member mounted on said first cage.

12. A heart valve as defined in claim 10, said inner cage being integral with said orifice ring and said first cage being a separate member mounted on said orifice ring and said inner cage.

13. A heart valve as defined in claim 1 including pins on the ends of said cage legs, and sockets in said orifice ring receiving said pins.

14. A heart valve as defined in claim 1, said track bars being molded into said cloth coverings.

15. A heart valve as defined in claim 14, said means securing said track bars to said legs comprising said cloth coverings.

16. A heart valve as defined in claim 14, said cage legs having longitudinal grooves receiving said track bars.

17. A heart valve as defined in claim 16, said track bars having portions on the inside of said cloth coverings projecting into said grooves and portions projecting from the outside of said cloth coverings to engage said valve member.

18. A heart valve as defined in claim 17, said orifice ring having an outwardly facing channel therearound and the legs of said cage having hooked ends secured in said channel.

* * * * *